US006988246B2

(12) United States Patent
Kopitzke et al.

(10) Patent No.: US 6,988,246 B2
(45) Date of Patent: Jan. 17, 2006

(54) TOUCH SENSITIVE INPUT AND DISPLAY ARRANGEMENT FOR CONTROLLING AND MONITORING AIRCRAFT CABIN SYSTEMS

(75) Inventors: Kirsten Kopitzke, Hamburg (DE); Martin Frey, Buchholz (DE); Joerg Holst, Wulmstorf (DE); Christian Riedel, Bliedersdorf (DE)

(73) Assignees: Airbus Deutschland GmbH, Hamburg (DE); KID-Systeme GmbH, Buxtehude (DE)

( * ) Notice: Subject to any disclaimer, the term of this patent is extended or adjusted under 35 U.S.C. 154(b) by 446 days.

(21) Appl. No.: 09/871,032

(22) Filed: May 31, 2001

(65) Prior Publication Data

US 2002/0015063 A1 Feb. 7, 2002

(30) Foreign Application Priority Data

May 31, 2000 (DE) ........................................ 100 26 788
Jan. 4, 2001 (DE) ........................................ 101 00 273

(51) Int. Cl.
*G06F 9/00* (2006.01)

(52) U.S. Cl. .................... 715/810; 715/702; 244/118.5; 700/277

(58) Field of Classification Search ................. 715/810, 715/702; 244/118.5, 134; 700/210, 277; 345/810, 345/702
See application file for complete search history.

(56) References Cited

U.S. PATENT DOCUMENTS

| | | | | | |
|---|---|---|---|---|---|
| 5,086,385 | A | * | 2/1992 | Launey et al. | 700/83 |
| 5,541,981 | A | * | 7/1996 | Lynn | 379/88.25 |
| 5,677,603 | A | * | 10/1997 | Speirs et al. | 315/324 |
| 2004/0119748 | A1 | | 6/2004 | Kopitske et al. | |
| 2004/0145612 | A1 | | 7/2004 | Kopitske et al. | |

FOREIGN PATENT DOCUMENTS

| | | |
|---|---|---|
| GB | 2346350 | 8/2000 |

* cited by examiner

*Primary Examiner*—Raymond J. Bayerl
*Assistant Examiner*—Dennis G. Bonshock
(74) *Attorney, Agent, or Firm*—W. F. Fasse; W. G. Fasse

(57) ABSTRACT

A monitoring and control device includes a touch sensitive LCD screen, with a basic layout including a display area and touch sensitive keys depicted with associated system and function symbols. A main menu or any one of plural system menus can be selectively displayed in the display area. The system menus relate to cabin systems such as audio, lighting, and water systems. The selected system menu displays status information and touch input keys for the user to monitor the status and to select and control the operation of the system. The main menu is a top level window providing essential information regarding all of the cabin systems and allows a user to select any one of the system menus. The device is compact, user-friendly, and adaptable to various system requirements by mere software reprogramming. The displays and input keys are all virtual elements generated by software.

28 Claims, 9 Drawing Sheets

TOUCH SENSITIVE INPUT AND DISPLAY ARRANGEMENT FOR CONTROLLING AND MONITORING AIRCRAFT CABIN SYSTEMS

PRIORITY CLAIM

This application is based on and claims the priority under 35 U.S.C. §119 of German Patent Applications 100 26 788.2, filed on May 31, 2000, and 101 00 273.4, filed on Jan. 4, 2001, the entire disclosures of which is incorporated herein by reference.

FIELD OF THE INVENTION

The invention relates to an apparatus for controlling and monitoring aircraft cabin systems, for example the functions of the information, audio, video, lighting, door, water supply, or wastewater systems, and further relates to a method for operating the apparatus.

BACKGROUND INFORMATION

The operation and status of present day aircraft cabin systems are typically controlled and monitored from operating devices having simple input key panels and relatively small liquid crystal displays. With such operating devices, the functionality of the display and of the input keys is quite limited, or even strictly fixed to a respective single assigned function. In other words, there is little or no flexibility or adaptability of the present day conventional operating devices to accommodate changes of the respective cabin systems that are to be controlled or monitored. Therefore, the technical possibilities with regard to the expansion, flexibility, and adaptation to the most modern technologies are completely exhausted. There is a need to provide a more versatile, adaptable, user-friendly, and intuitively operable device for monitoring and controlling aircraft cabin systems.

SUMMARY OF THE INVENTION

In view of the above, it is an object of the invention to provide a device or arrangement of the above mentioned general type, which can be adapted to various prescribed requirements existing in any given application, for controlling and monitoring a variety of aircraft cabin systems from a single compact input and display arrangement. It is another object of the invention to provide a method for operating such a control and monitoring arrangement, which is user-friendly, intuitive, adaptable and reprogrammable to accommodate variations of the systems to be controlled and monitored. The invention further aims to avoid or overcome the disadvantages of the prior art, and to achieve additional advantages, as apparent from the present specification.

The above objects have been achieved according to the invention in a flight attendant operating device in the form of an input and display arrangement or interface panel comprising a liquid crystal display screen and a touch sensitive surface input arrangement. The liquid crystal display screen comprises a basic layout including a general display area as well as touch sensitive input keys embodied or provided with respective system and function symbols respectively associated with these input keys. The symbols may be words, letters, graphical icons, or any other identifying indicia. At least two system menus, which are respectively associated with two respective cabin systems, are provided as subordinate to the basic layout and can be displayed selectively on the general display area of the basic layout for selecting, controlling and monitoring the functions of the respective associated cabin system. As such, the respective individual system menus each operate as a system-specific window that can be selectively brought up in the display area of the basic layout. The system menus are thus virtual menus that may include virtual display areas and/or virtual input areas, and that may be selectively brought up and displayed in the display area of the basic layout.

All of the various menus or other features that are to be displayed in the display area of the basic layout can be generated, selected, arranged, and manipulated in any conventionally known manner by means of appropriate software and/or hardware, operating in the context of a computer system, which may be the general aircraft computer system, or a portion thereof, or a separate cabin system control computer. In response to the user inputs received from the inventive device, the computer then sends corresponding control command signals to the respective cabin systems to effectuate the desired control functions in any known manner.

According to further detailed embodiments, the invention provides for a main menu that can be displayed on the display area of the basic layout and that indicates the cabin status, i.e. the status of various systems or components within the cabin. Thereby, the main menu is provided or hierarchically arranged between the basic layout and the system menus. The main menu displays the essential information regarding the various cabin systems so that one or more of the cabin systems may be selected from a menu page of the main menu. The invention further preferably provides that the basic layout additionally includes, across the top of the basic layout, a header line or bar that identifies the respective active menu.

The above objects have further been achieved according to the invention in a method of operating the above described arrangement, including the following steps:

a) an operator or user such as a flight attendant first touches or presses a desired system symbol on the basic layout or on the main menu so as to select and call up the respective associated main menu or subordinate system menu;

b) as a result, the selected main menu or system menu will be displayed on the general display area of the liquid crystal display screen; and c) the operator then touches or presses respective pertinent function symbols displayed on the selected main menu or system menu, whereby these function symbols are respectively associated with prescribed operating functions of the pertinent selected system, in order to thereby select and/or adjust the desired operating functions of the respective associated selected cabin system.

The invention thus provides an apparatus whereby the flight attendant operating device may advantageously be universally adapted to various different respective requirements, by making use of touch sensitive screen technology. In other words, the display area of the basic layout is embodied as a touch sensitive screen, and can have various menus or windows displayed selectively thereon. The input keys of any system menu are essentially virtual input keys that can be displayed as needed for the various subsystems in the display area of the basic layout. Respective touch sensitive areas of the touch sensitive screen respectively in registration with the virtual displayed input keys will receive the touch inputs of the user.

Thereby, any given portion or area of the basic layout is not strictly dedicated to a particular function, but instead the display and input functions can be variably indicated or arranged on the basic layout as needed. Moreover, a required change of the display and/or input functions to accommodate a change or difference in the respective aircraft cabin systems can be achieved by simply reprogramming the software that generates the various displays and input functions. Such universal adaptability is directly linked to the required flexibility. Furthermore, the inventive arrangement provides a single, compact, versatile operator interface that makes it possible to control and monitor all of the relevant aircraft cabin systems from this single compact unit.

The inventive operating device or operator interface provides the following advantages:

a) easy user recognition of known functions and processes or sequences;

b) intuitively correct user inputs without requiring specialized training;

c) the possibility of reallocation and reuse of the same individual elements such as input keys, symbols, display fields, etc. to various different systems and/or functions;

d) by using a color display screen, it becomes possible to maintain a consistent color scheme or philosophy, i.e. using the same colors universally in connection with the same purpose, condition, status, or result to be achieved;

e) the display properties of the device can be adjusted or adapted to maintain good visibility under varying lighting conditions within the aircraft cabin; and f) use of the fewest possible submenu planes for achieving a relatively flat hierarchy of the sub-menus or sub-windows.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
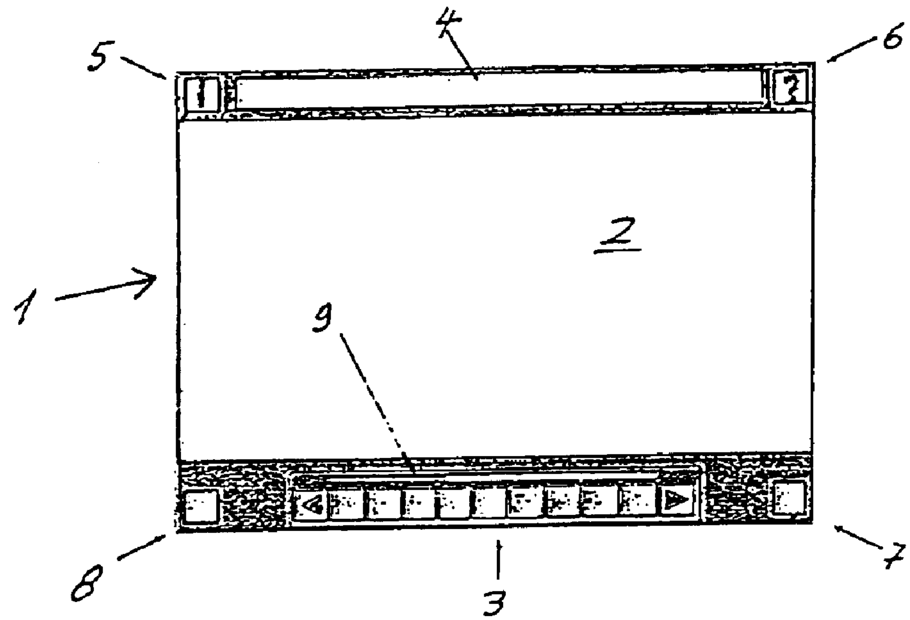
FIG. 1 schematically shows the basic layout of an operating device according to the invention, including a liquid crystal display screen and a touch sensitive surface input arrangement.

FIG. 1 schematically shows the basic layout 1 of the operator surface or user interface of a flight attendant operating device, comprising a liquid crystal display screen in combination with a touch sensitive surface input arrangement, for example embodied together as a touch sensitive screen. The basic layout 1 is preferably divided into three parts or areas. Namely, the basic layout 1 comprises a general display area 2, pressure sensitive or touch sensitive input keys 3 respectively provided with system and functional symbols, and a header line or bar 4 for identifying the respective active menu. The available menus, which can be selected and displayed individually or together in any conventionally known single window or multiple window format, include a main menu 10 (see FIG. 2) and at least two or more system menus 11 to 19 (see FIG. 2). The selected menu is respectively displayed on the general display area 2 of the basic layout 1.

The main menu 10 displays the cabin status and the respective essential information or data regarding the various cabin systems so that a respective desired one of the cabin systems can be selected on a menu page of the main menu 10, for example by simply touching the touch sensitive screen in an area corresponding to the display of the respective cabin system information or symbols, or by touching one of the touch input keys 3 that is associated with that system. Once a respective one of the cabin systems is selected, the respective associated system menu will be displayed on the general display area 2 of the basic layout 1. The several system menus 11 to 19 are each respectively adapted for selecting, controlling and monitoring the functions of the respective associated cabin system. Thereby, the respective system menu is subordinate to the basic layout 1 and is displayed on the display area 2 when it is selected. Advantageously, the touch input keys 3 of the basic layout 1 are accessible and usable for an operator of the device regardless of the particular menu being displayed, i.e. for each display of a respective menu on the display area 2.

As can also be seen in FIG. 1, the device further includes, incorporated in the basic layout 1, an information key 5, a help key or button 6, a key or switch 7 for directly calling up the main menu regardless of the presently active state of the display area 2, and a locking switch or key 8 for switching off and/or locking the display screen. Particularly, from any screen or menu or display, the information key 5 will provide context-sensitive further information for the operator of the apparatus, while the help key 6 will provide context-sensitive operating instructions and further help for operating the apparatus. For example, if the lighting system menu 12 is being displayed, the information key 5 would provide further detailed technical information, status information and the like regarding the various lighting system components, while the help key 6 would provide instructions or guidance as to the appropriate lighting selections and how to enter the desired lighting selections in the context of the lighting system menu 12.

A scroll bar 9 is arranged above the keys 3 for the system and function symbols, whereby this scroll bar 9 shows an operator of the device that further menu sets are available. Preferably, the length of the elements of the scroll bar 9 approximately indicate the number of the subsequent menu sets. By operating the scroll bar, the successive available menu sets can be scrolled through, for example by scrolling the respective associated virtual labels or indications of the system or functional symbols indicated on the respective touch sensitive keys 3. This is achieved, for example, by touching the scrolling arrow keys at the two ends of the strip of touch sensitive input keys 3.

Figure 2:
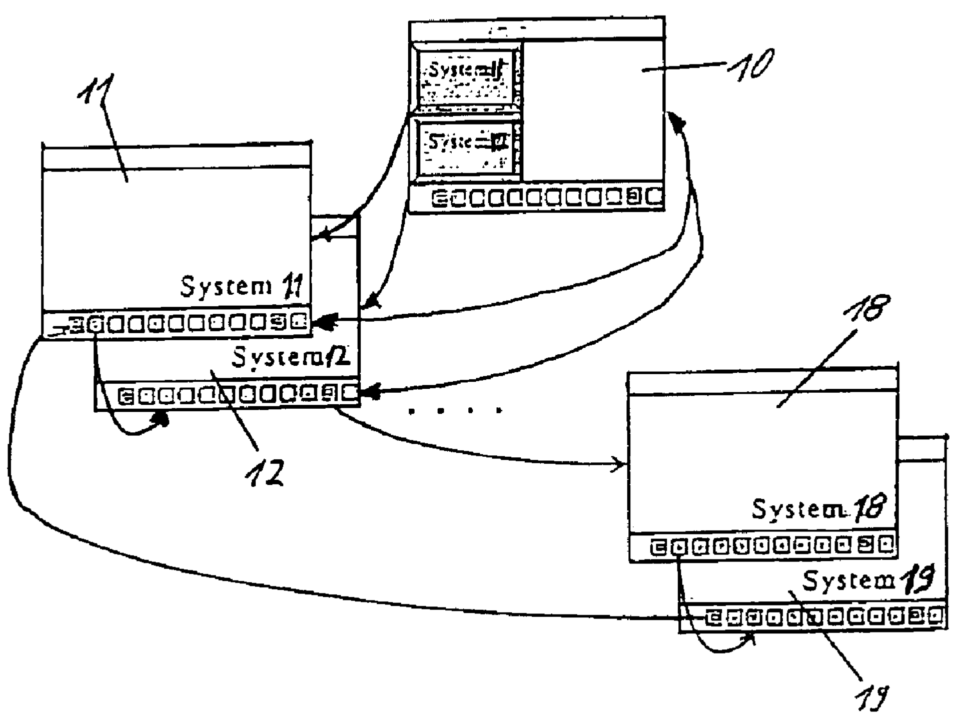
FIG. 2 is a schematic diagram representing the interrelationships of the menu structure of the main menu and several subordinate system menus.

The menu structure represented in FIG. 2 shows the main menu 10 and several subordinate system menus 11 to 19.

The main menu key 7 for calling up the main menu, the system and function symbol keys 3 and the header line 4 of the basic layout 1 will be maintained on the basic layout 1 during and regardless of the call-up and display of any selected one of the several menus in the display area 2. This is schematically indicated in that these elements are consistently shown in each one of the illustrated menus 11 to 19. The main menu 10 is conceptually arranged between the basic layout 1 and the several system menus 11 to 19, whereby any desired one of the system menus 11 to 19 can be selected and called up by an operator by manually touching the touch input keys 3 provided with the corresponding system and function symbols, or simply by touching the depiction of a corresponding system icon or symbol on the active main menu 10 being displayed on the touch sensitive general display area 2 of the basic layout 1. As an alternative, the system menus 11 to 19 can be automatically successively called up and displayed in the display area 2 of the basic layout 1, for example according to a prescribed succession plan or display sequence.

The linkages between the several system menus and the main menu are illustrated by corresponding arrows in FIG. 2. For example, from any system screen being displayed in the display area 2 of the basic layout 1, the operator can return directly to the main menu 10 by pressing the main menu key 7, also called the cabin status key 7. Similarly, from any displayed menu, the operator can directly select a different desired system menu by pressing the corresponding touch input key 3 labeled with the appropriate corresponding system symbol or label. The scroll arrow touch input keys will, for example, scroll to the next successive or the previous system menu. In any event, once the selected main menu or system menu is displayed on the display area 2 of the basic layout 1, the touch sensitive display screen becomes active with the appropriate touch sensitive input areas associated with the respective displayed menu. Thereby, the operator can select or control desired operating conditions of the respective displayed cabin system associated with the selected one of the system menus 11 to 19 by simply touching the appropriate corresponding function symbols being displayed on the associated menu on the display area 2 of the basic layout 1.

Further details of the individual menus respectively shown in FIGS. 4 to 10 will be discussed below. In the context of the following discussion, several advantages of the invention will become apparent. The invention allows a reduction of the number of individual or separate operating devices. Namely, a single operating device is provided for monitoring and controlling all of the pertinent cabin systems. This in turn leads to a weight and cost reduction, savings with regard to the costs and effort needed for installation and cable connections, and makes simplified networking of the device possible. The inventive apparatus fulfills the specifications and other requirements for the control and monitoring of aircraft cabin systems especially in the newest high capacity aircraft, for example in connection with a complex lighting control or climate control, as well as providing an open interface for server applications and software download capabilities. The inventive apparatus can be readily adapted to accommodate the requirements of various customers of the aircraft manufacturer, i.e. the various airlines purchasing the aircraft. This is especially true because essentially all of the adaptations can be achieved simply by changes of the software and/or parameters in the cabin allocation or assignment module. An adaptation of the hardware (devices or accessories) is no longer necessary. All expansions and provision of new functions can be achieved simply by updating the software and/or the parameters in the cabin allocation or assignment module. It is therefore also possible that each customer airline can carry through its own individual company identity with special functions, options, displays, logos, messages, color schemes, or the like.

Figure 3:
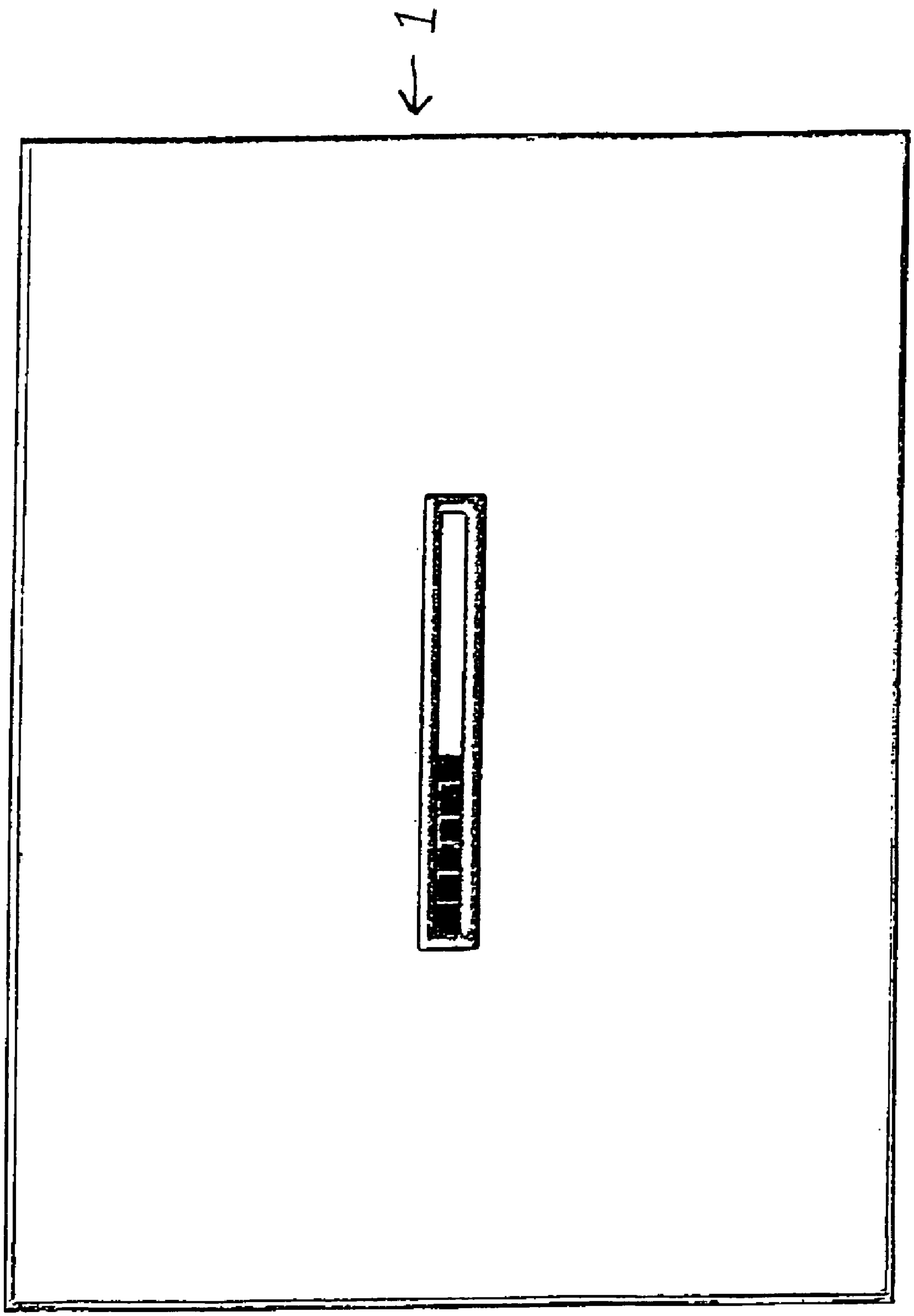
FIG. 3 schematically shows the appearance of the arrangement during a booting phase.

The simple schematic view of FIG. 3 represents the appearance of the overall apparatus or device during booting up of the overall system software, as shown with a so-called progress bar showing the progress of the boot-up procedure, for example. Note that the liquid crystal display screen is otherwise blank or empty. This demonstrates the preferred embodiment in which the entire user interface is embodied as a versatile, adaptable touch sensitive display screen, on which all of the touch input keys, display areas and the like are virtually generated and displayed as necessary for the particular situation. None of the input keys needs to be a permanent hard-wired element. After completion of the boot-up process, preferably the main menu 10 shown in FIG. 4 will be displayed on the general display area 2 of the basic layout 1.

Figure 4:
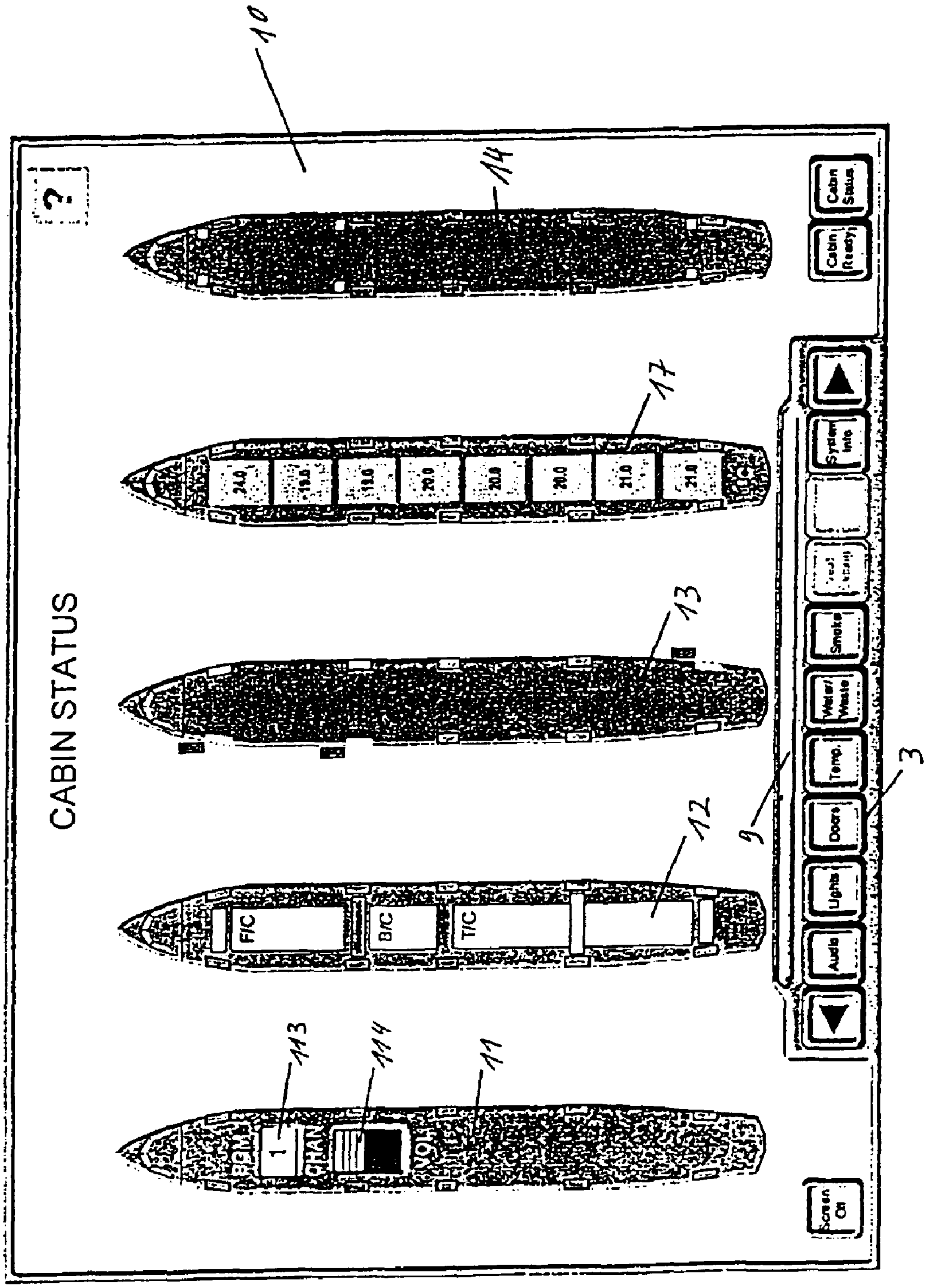
FIG. 4 schematically shows the main menu with five graphically displayed examples of subordinate cabin systems that can be selected.

As shown in FIG. 4, the main menu 10 provides a general overview of the overall cabin status and includes the essential information or data regarding the various cabin systems to allow the desired pertinent cabin system to be selected. For example, the main menu 10 shows the cabin status of five different cabin systems relating to the system menus 11 to 15, namely for the cabin audio system 11, the cabin lighting system 12, the aircraft doors 13,the water supply and wastewater system 14, and the temperature or air-conditioning system 17. These several systems are respectively displayed with a corresponding graphical display image or icon of an aircraft cabin (e.g. a schematic plan view outline of the aircraft cabin) showing the relevant aspects of the cabin layout on the display area 2, and from there the respective corresponding system menus can be directly selected and called-up by means of the touch sensitive screen technology, namely by simply touching the area of the display screen 2 on which the selected system image is displayed.

Figure 5:
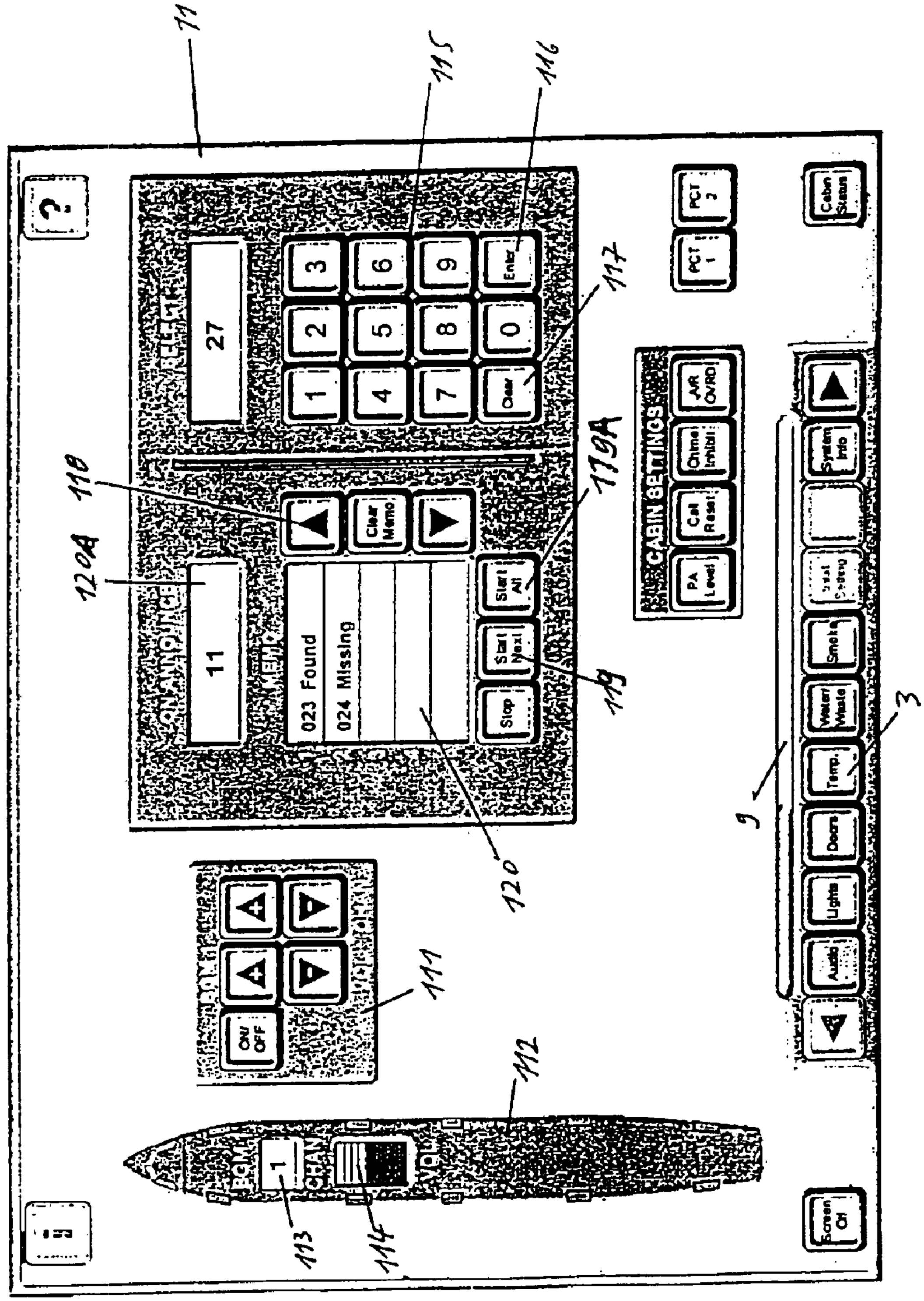
FIG. 5 schematically shows a system menu associated with an audio system of the aircraft.

The system menu 11 shown in FIG. 5 is for controlling and monitoring the aircraft cabin audio system, namely with respect to selecting and playing previously recorded announcements as well as adjusting or selecting the on-board music channel. In this context, selection of the music channel and the volume is carried out by means of the respective corresponding +/−keys 111 in a virtual keyboard grouping on the left side of the system menu 11. The currently existing status of these adjustments, i.e. the actually selected music channel and volume, is respectively indicated in corresponding display fields, namely a channel indicator 113 and a volume indicator 114 within a graphical aircraft symbol 112.

On the other hand, passenger information and instruction announcements can be selected in a virtual display and keypad screen on the right side of the system menu 11, for example through selection or input of the corresponding associated number of the announcement via the numerical key pad 115. Then, by pressing the enter key 116, the presently entered announcement number may be confirmed and selected, while on the other hand the clear key 117 may be touched in order to erase or clear the entered number. The arrow keys 118 can be used to scroll through the available recorded announcements in order to find one or more desired announcements in a targeted manner, to be queued in a view window or memo window 120. The start key 119 can then be used to play the next selected announcement, while the clear key 117 can be used to clear the preselection. The "start-all" key 119A can be touched to begin a sequential playing of all of the selected or stored announcements, while the list or sequence of stored announcements to be played is indicated in the memo window 120, and the number of the currently playing announcement is displayed in the indicator field 120A above the memo window 120. In order to interrupt the playing of the announcement or announcements, a stop key is also provided.

Additional functions pertinent to the audio system can also be displayed and selected via virtual displays and keys, for example to adjust the PA level, to reset the call buttons, to inhibit call chimes, or the like. This is merely an example demonstration of various different functions and features that can be displayed and selected based on the needs of the individual application, simply by appropriate program adjustments.

Figure 6:
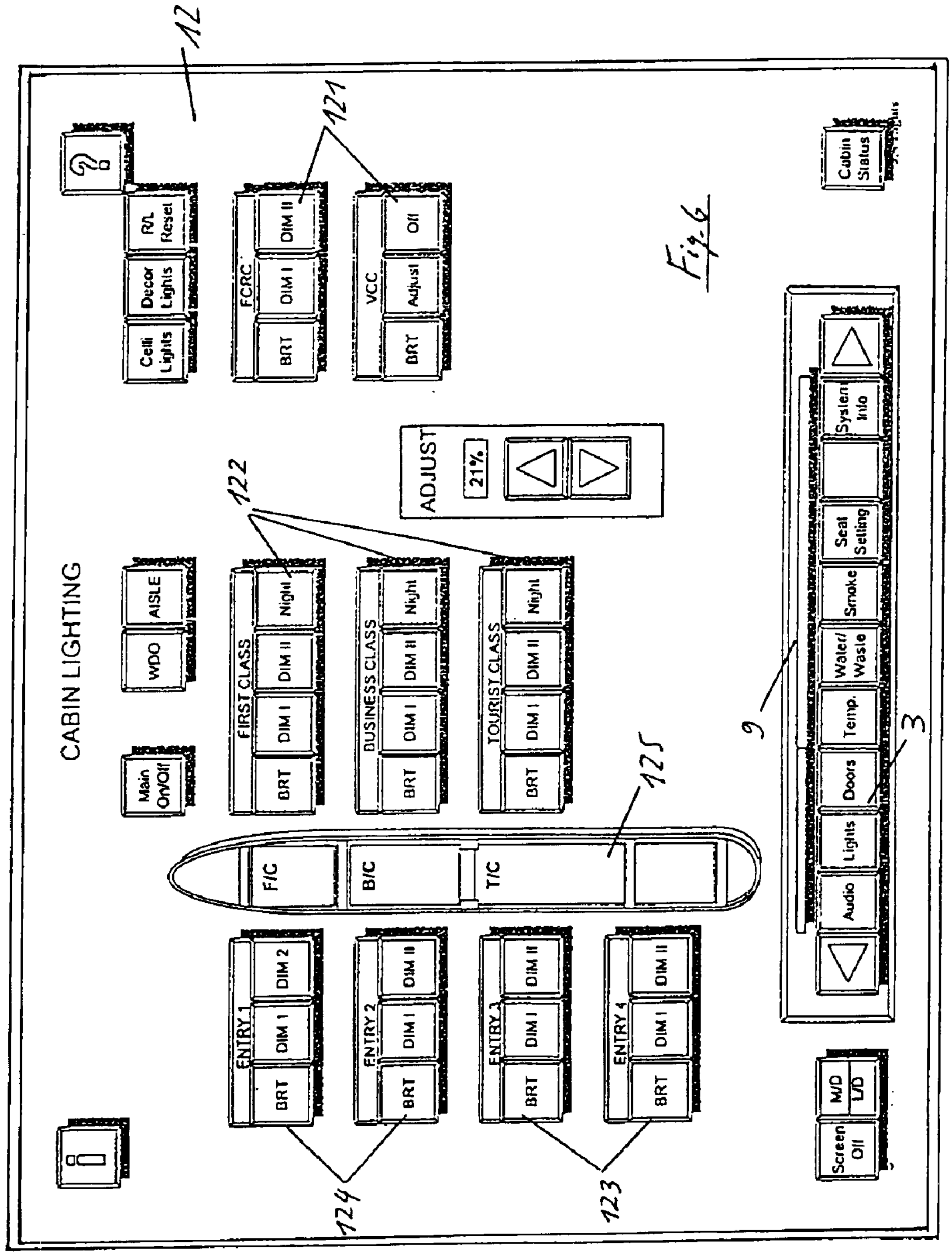
FIG. 6 schematically shows a system menu associated with a lighting system of the aircraft.

The system menu 12 shown in FIG. 6 controls the cabin lighting system in the aircraft cabin. For example, this cabin lighting system can include separate lighting arrangements for the door entry zones, separate cabin zones, and/or individual independent partitioned areas, spaces or cabins within the aircraft, which may all be individually controlled and monitored from the system menu 12. In this regard, the system menu 12 includes several sets or groups of touch input keys 121, 122, 123 and 124, which each allow selection or adjustment of the desired lighting brightness level in respective different cabin areas. Preferably, in the cabin entry zones, any desired one of three brightness steps, namely bright or full illumination, dimming stage 1, and dimming stage 2 can be selected. The current, actually selected lighting adjustments are displayed in a graphical aircraft symbol 125, which is advantageously divided into the various lighting zones. Various other display features and/or input keys can be provided on the screen display of this system menu 12, as needed for any particular application. For example, a fine-tuned brightness or dimness adjustment is possible by selecting a particular percentage of the maximum full brightness with corresponding arrow scroll keys. The functions of the other exemplary keys shown in FIG. 6 are self-explanatory in the context of aircraft cabin lighting systems.

Figure 7:
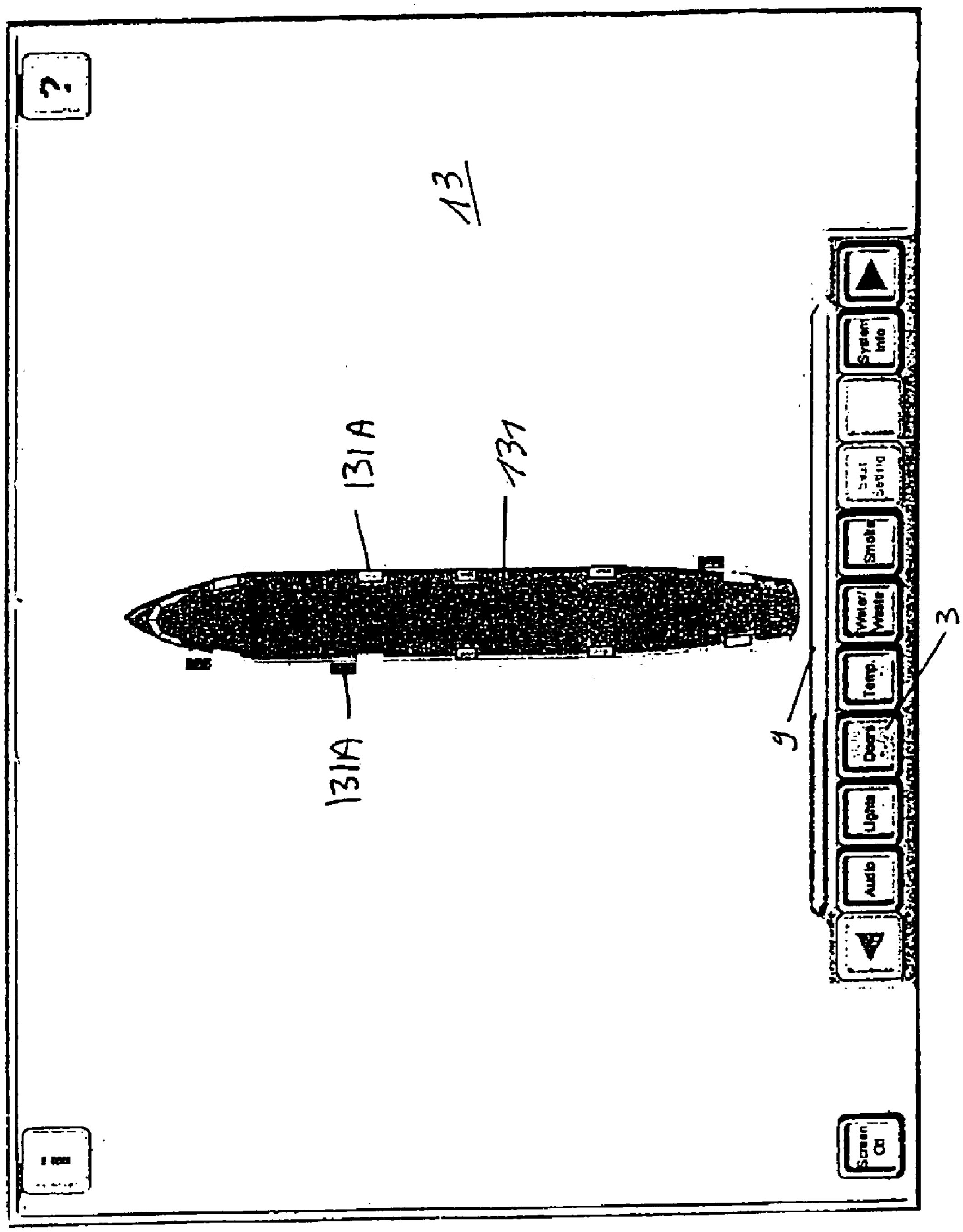
FIG. 7 schematically shows a system menu associated with all aircraft doors of the aircraft.

FIG. 7 shows a system menu 13, which shows the actual present status of all cabin doors and hatches. For example, a graphical aircraft symbol 131 includes a clearly visible graphical indication 131A of each door, emergency exit hatch, emergency slide, and the like, as well as the respective status thereof. For example, the display or status indication can provide information whether each respective door or hatch is closed or open, pressure-tight or not pressure-tight, locked or unlocked, etc.

Figure 8:
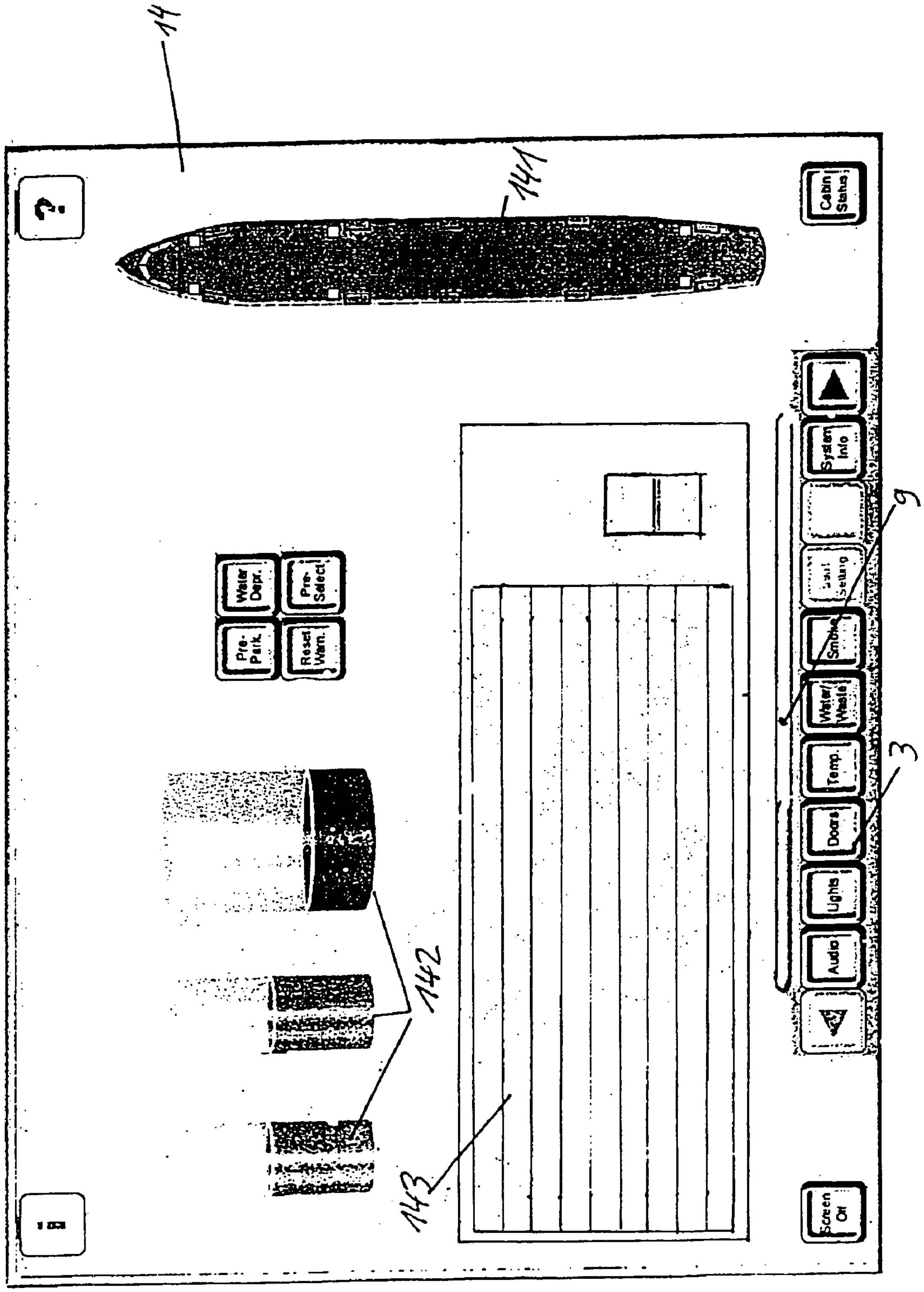
FIG. 8 schematically shows a system menu associated with the water supply and wastewater system of the aircraft.

The system menu 14 shown in FIG. 8 is associated with the water supply and wastewater systems of the aircraft. The system menu 14 includes, on the right side, a graphical aircraft symbol 141, in which the location of each galley and each restroom or toilet is indicated. It is also indicated whether the galley or restroom is properly functional and active, or inactive due to a malfunction or error. In the upper part of the menu 14, graphical images of supply water and wastewater tanks 142 also show the current actual existing water level or volume of water in each tank. Arrows or other indicators can mark prescribed volume values or warning levels or the like. Furthermore, a display screen 143 allows the current actual existing status values of the above mentioned components to be displayed. Input and selection keys can also be provided to allow an operator to control these components.

Figure 9:
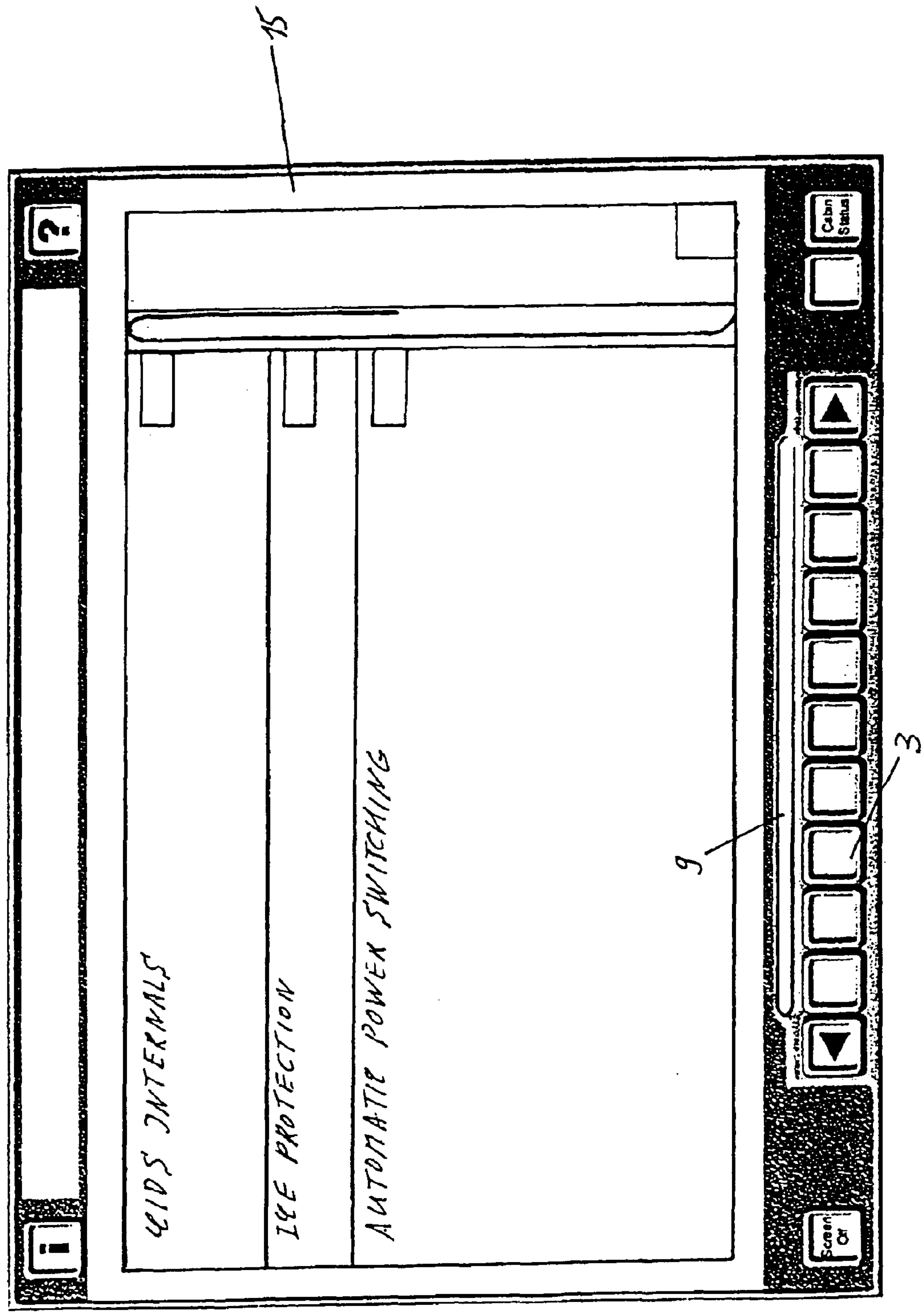
FIG. 9 schematically shows a system menu for indicating the status of all of the cabin systems.

Accordingly to FIG. 9, the inventive apparatus further provides a system menu 15, which displays status values of various cabin systems, and which is preferably called-up before take-off of any flight. An automatic call-up and display of this menu 15 is also advantageous during any flight phase, if the flight crew of the aircraft requires information or status data regarding any of the individual systems. For example, the display can include display fields for status information regarding the cabin intercommunication data system (CIDS), the ice or freeze protection devices, or the electric power supply system. By touching a selection key associated with each respective display field, the operator can then obtain detailed status information regarding the particular selected system.

Figure 10:
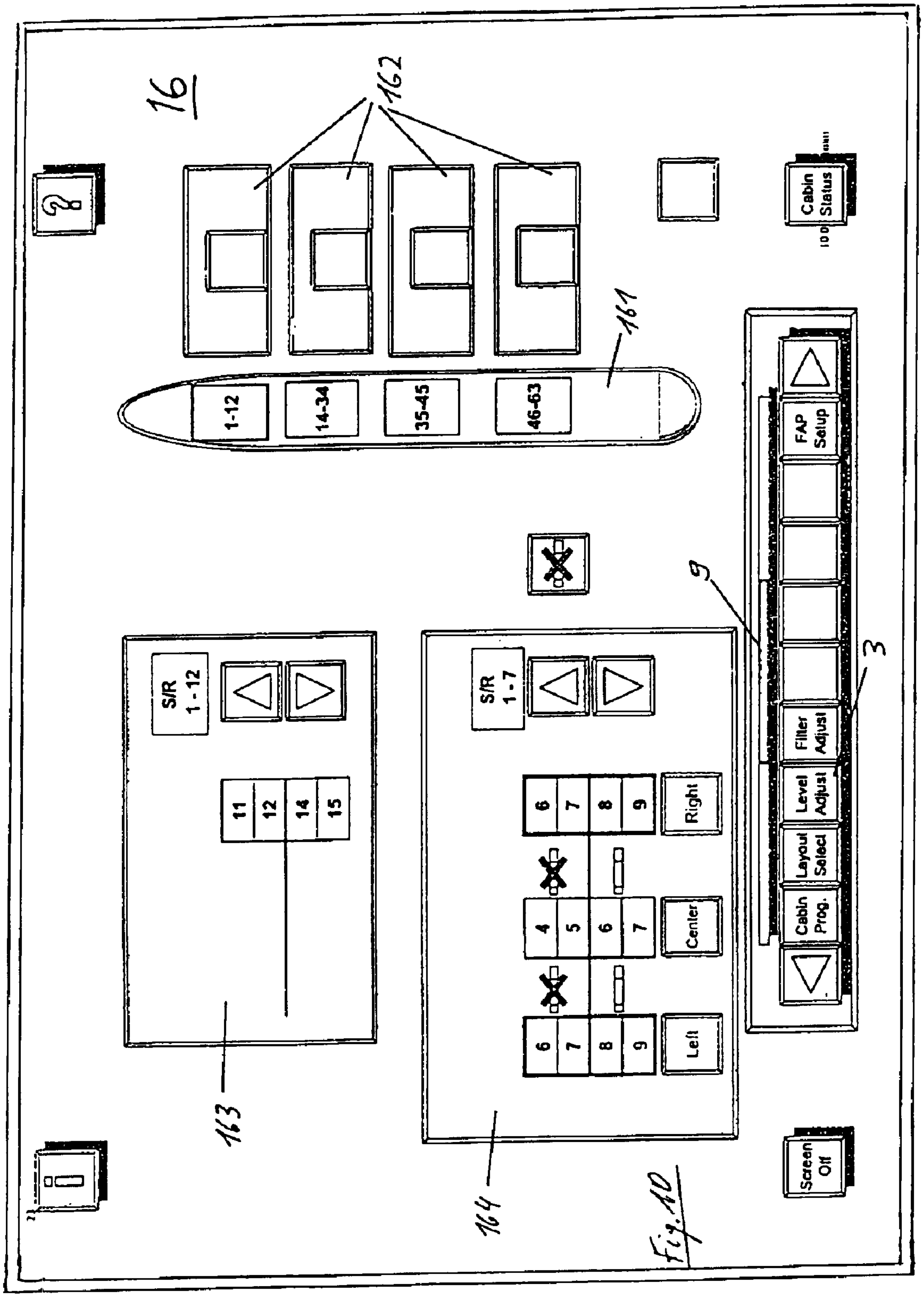
FIG. 10 schematically shows a system menu for programming various functions of the cabin systems.

The system menu 16 shown in FIG. 10 is provided to allow programming of the cabin systems, for example with regard to various parameters in different cabin zones. In the illustrated example, a graphical aircraft symbol 161 shows the several cabin zones, for example in respective seat row ranges or areas, and various touch input key fields 162, 163 and 164 for inputting programming commands for the associated functions in relation to the respective cabin zones or areas. For example, the display and input key field 164 allows a programming of the cabin areas in which smoking will be allowed and those cabin areas in which smoking will not be allowed, e.g. by illuminating the corresponding appropriate smoking or non-smoking indicators in the respective associated cabin areas.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement for monitoring the status of and controlling the functions of aircraft cabin systems selected from a cabin information system, a cabin audio system, a cabin video system, a cabin lighting system, a cabin air conditioning system, a cabin smoke detector system, an aircraft door monitoring system, and a water supply and wastewater system, wherein:

said arrangement comprises a user interface panel comprising a liquid crystal display screen and a touch sensitive surface input arrangement superimposed at least partly over said display screen, said user interface panel includes a basic layout including a general display area of said display screen and a plurality of touch input keys respectively labeled with system or function identifying symbols, said arrangement further comprises a first system menu associated with a first one of said cabin systems and a second system menu associated with a second one of said cabin systems, said first system menu can be selectively displayed on said general display area whereby said first system menu shows status information and operating functions of said first cabin system and allows a user to select and control said operating functions of said first cabin system via said touch sensitive surface input arrangement, said second system menu can be selectively displayed on said general display area whereby said second system menu shows status information and operating functions of said second cabin system and allows a user to select and control said operating functions of said second cabin system via said touch sensitive surface input arrangement, and said arrangement further comprises a main menu that can be selectively displayed on said general display area and that simultaneously depicts first and second essential informations respectively representing a first system status about said first cabin system and a second system status about said second cabin system, and that allows the user to select a desired one of said first and second system menus from said main menu.

2. The arrangement according to claim 1, wherein said touch input keys respectively comprise respective touch input areas of said touch sensitive surface input arrangement, and said system or function identifying symbols are displayed on said display screen at locations respectively in registration with said touch input areas of said touch sensitive surface input arrangement.

3. The arrangement according to claim 1, wherein said touch input keys are permanent physical input keys separate and distinct from said touch sensitive surface input arrangement.

4. The arrangement according to claim 1, further comprising a computer connected to said user interface panel, and software to be executed in said computer for generating and displaying at least said first system menu and said second system menu on said general display area, and for evaluating and processing touch input signals from said touch sensitive surface input arrangement to select and control said operating functions of said first and second cabin systems.

5. The arrangement according to claim 1, wherein said basic layout further includes a header line which displays an identification of a respective active one of said menus that is being displayed on said general display area.

6. The arrangement according to claim 1, wherein said touch input keys of said basic layout are maintained available and accessible to the user continuously and regardless which of said menus is being displayed on said general display area.

7. The arrangement according to claim 1, wherein said user interface panel comprises a versatile adaptable touch sensitive screen that incorporates both said display screen and said touch sensitive surface input arrangement.

8. The arrangement according to claim 1, wherein said first cabin system is said cabin audio system, said first system menu is a cabin audio system menu, and said cabin audio system menu includes display indicators and input buttons for the user to monitor, select and play pre-recorded announcements of said cabin audio system and to monitor and adjust an on-board music channel of said cabin audio system.

9. The arrangement according to claims 8, wherein said display indicators and said input buttons include a numerical display field and an input keypad, which enable the user to input a corresponding number to select a desired one of the pre-recorded announcements.

10. The arrangement according to claim 8, wherein said display indicators and said input buttons allow all of the pre-recorded announcements to be queued and played in sequence.

11. The arrangement according to claim 1, wherein said first cabin system is said cabin lighting system, said first system menu is a cabin lighting system menu, and said cabin lighting system menu includes display indicators and input buttons for the user to monitor, select and adjust said cabin lighting system respectively individually for various different areas in an aircraft cabin.

12. The arrangement according to claim 11, wherein said display indicators and input buttons provide three selectable brightness levels of illumination by said cabin lighting system in cabin entry zones in an aircraft cabin.

13. The arrangement according to claim 1, wherein said first cabin system is said aircraft door monitoring system, said first system menu is a door monitoring system menu, and said door monitoring system menu includes display indicators that represent each door and hatch of the aircraft and indicate a respective status thereof.

14. The arrangement according to claim 1, further comprising a status menu that can be selectively displayed on said general display area, whereby said status menu displays status information respectively regarding all of said cabin systems.

15. The arrangement according to claim 1, further comprising a programming menu that can be selectively displayed on said general display area, whereby said programming menu includes display indicators and input buttons to allow the user to program functions of a plurality of said cabin systems.

16. A method of operating the arrangement according to claim 1, comprising the following steps carried out by a user:

a) touching a respective one of said touch input keys labeled with a respective one of said system identifying symbols associated with a desired one of said system menus or said main menu to call up and display said desired one of said system menus or said main menu on said general display area;

b) if said main menu is displayed on said general display area, then touching a portion of said main menu corresponding to a desired one of said system menus on said touch sensitive surface input arrangement superimposed over said general display area;

c) when said desired one of said system menus is displayed on said general display area, touching a portion of said desired one of said system menus corresponding to a desired one of said operating functions on said touch sensitive surface input arrangement superimposed over said general display area so as to select and adjust said desired one of said operating functions of a desired one of said cabin systems associated with said desired one of said system menus.

17. An aircraft cabin systems controller that enables a user to monitor status information and to control functions of plural cabin systems in an aircraft cabin, said cabin systems being selected from a group consisting of a cabin information system, a cabin audio system, a cabin video system, a cabin lighting system, a cabin air conditioning system, a cabin smoke detector system, an aircraft door monitoring system, and an aircraft water system, wherein said aircraft cabin systems controller comprises:

a user interface panel that includes a display screen and a touch sensitive surface input arrangement superimposed over at least a portion of said display screen;

a computer-generated first system display that is selectively displayed on said display screen, and that shows first status information and first operating functions of a first one of said cabin systems and allows the user to select and control said first operating functions by touching said touch sensitive surface input arrangement superimposed on said first system display on said display screen;

a computer-generated second system display that is selectively displayed on said display screen, and that shows second status information and second operating functions of a second one of said cabin systems and allows the user to select and control said second operating functions by touching said touch sensitive surface input arrangement superimposed on said second system display on said display screen; and a computer-generated main cabin status display that is selectively displayed on said display screen, and that simultaneously shows first overview status information regarding said first cabin system and second overview status information regarding said second cabin system, and that allows the user, by touching said touch sensitive surface input arrangement superimposed on said main cabin status display on said display screen, to select a desired one of said first and second system displays to be selectively displayed on said display screen.

18. The aircraft cabin systems controller according to claim 17, wherein:

said controller further comprises a computer-generated third system display that is selectively displayed on said display screen, and that shows third status information and third operating functions of a third one of said cabin systems and allows the user to select and control said third operating functions by touching said touch sensitive surface input arrangement superimposed on said third system display on said display screen; and said main cabin status display further shows third overview status information regarding said third cabin system simultaneously with said first and second overview status information, and further allows the user to select said desired one of said system displays among said first, second and third system displays.

19. The aircraft cabin systems controller according to claim 18, wherein:

said controller further comprises a computer-generated fourth system display that is selectively displayed on said display screen, and that shows fourth status information and fourth operating functions of a fourth one of said cabin systems and allows the user to select and control said fourth operating functions by touching said touch sensitive surface input arrangement superimposed on said fourth system display on said display screen; and said main cabin status display further shows fourth overview status information regarding said fourth cabin system simultaneously with said first, second and third overview status informations, and further allows the user to select said desired one of said system displays among said first, second, third and fourth system displays.

20. The aircraft cabin systems controller according to claim 17, wherein said main cabin status display includes:

a first graphical aircraft symbol schematically representing a plan view of the aircraft cabin, wherein said first overview status information regarding said first cabin system is displayed on and/or adjacent to said first graphical aircraft symbol; and a second graphical aircraft symbol schematically representing a plan view of the aircraft cabin, wherein said second overview status information regarding said second cabin system is displayed on and/or adjacent to said second graphical aircraft symbol.

21. The aircraft cabin systems controller according to claim 20, wherein said touch sensitive surface input arrangement includes:

a first touch sensitive area that is superimposed on said first graphical aircraft symbol and is linked to said first system display to allow the user to select said first system display as said desired one of said system displays by touching said first touch sensitive area; and a second touch sensitive area that is superimposed on said second graphical aircraft symbol and is linked to said second system display to allow the user to select said second system display as said desired one of said system displays by touching said second touch sensitive area.

22. The aircraft cabin systems controller according to claim 17, wherein said user interface panel further includes plural touch buttons that are respectively individually linked to respective ones of said system displays to allow the user to select said desired one of said system displays by touching a respective one of said touch buttons that is linked to said desired one of said system displays.

23. The aircraft cabin systems controller according to claim 22, wherein all of said plural touch buttons are always available on said user interface panel when anyone of said first system display, said second system display, and said main cabin status display is displayed on said display screen.

24. The aircraft cabin systems controller according to claim 23, wherein said touch buttons comprise respective system identifying symbols that respectively identify respective ones of said system displays and that are displayed on said display screen, and respective touch sensitive areas of said touch sensitive surface input arrangement respectively superimposed on said system identifying symbols on said display screen.

25. The aircraft cabin systems controller according to claim 23, wherein said touch buttons respectively comprise permanent physical input keys that are separate and distinct from said touch sensitive surface input arrangement and that are incorporated into said user interface panel.

26. An aircraft cabin systems controller that enables a user to monitor status information and to control functions of plural cabin systems in an aircraft cabin, said cabin systems being selected from a cabin information system, a cabin audio system, a cabin video system, a cabin lighting system, a cabin air conditioning system, a cabin smoke detector system, an aircraft door monitoring system, and an aircraft water system, wherein said aircraft cabin systems controller comprises:

a user interface panel that includes a display screen and a touch sensitive surface input arrangement superimposed over at least a portion of said display screen;

a computer-generated first system display that is selectively displayed on said display screen, and that shows first status information and first operating functions of a first one of said cabin systems and allows the user to select and control said first operating functions by touching said touch sensitive surface input arrangement superimposed on said first system display on said display screen;

a computer-generated second system display that is selectively displayed on said display screen, and that shows second status information and second operating functions of a second one of said cabin systems and allows the user to select and control said second operating functions by touching said touch sensitive surface input arrangement superimposed on said second system display on said display screen; and a computer-generated main cabin display that is selectively displayed on said display screen and that simultaneously includes first and second graphical aircraft symbols each respectively schematically representing a plan view of the aircraft cabin and respectively simultaneously shoving first overview status information regarding said first cabin system on said first graphical aircraft symbol and showing second overview status information regarding said second cabin system on said second graphical aircraft symbol, and that allows the user, by touching said touch sensitive surface input arrangement superimposed on said main cabin display on said display screen, to select a desired one of said first and second system displays to be selectively displayed on said display screen;

wherein:

said touch sensitive surface input arrangement includes a first touch sensitive area that is superimposed on said first graphical aircraft symbol and is linked to said first system display to allow the user to select said first system display as said desired one of said system displays by touching said first touch sensitive area;

said touch sensitive surface input arrangement further includes a second touch sensitive area that is superimposed on said second graphical aircraft symbol and is linked to said second system display to allow the user to select said second system display as said desired one of said system displays by touching said second touch sensitive area; and said user interface panel further has incorporated therein plural touch buttons that are respectively individually linked to respective ones of said system displays to allow the user additionally to select said desired one of said system displays by touching a respective one of said touch buttons that is linked to said desired one of said system displays.

27. The aircraft cabin systems controller according to claim 26, wherein all of said plural touch buttons are always available on said user interface panel when any one of said first system display, said second system display, and said main cabin display is displayed on said display screen.

28. The aircraft cabin systems controller according to claim 27, wherein said touch buttons comprise respective system identifying symbols that respectively identify respective ones of said system displays and that are displayed on said display screen, and respective touch sensitive areas of said touch sensitive surface input arrangement respectively superimposed on said system identifying symbols on said display screen.

* * * * *

UNITED STATES PATENT AND TRADEMARK OFFICE

CERTIFICATE OF CORRECTION

PATENT NO. : 6,988,246 B2
APPLICATION NO. : 09/871032
DATED : January 17, 2006
INVENTOR(S) : Kopitzke et al.

It is certified that error appears in the above-identified patent and that said Letters Patent is hereby corrected as shown below:

Title page,
Item [56], Reference Cited, U.S. Patent Documents,
Lines 4 and 5, replace “Kopitske et al.” by --Kopitzke et al.--;

Column 9,
Line 5, after “area”, insert --,--;
Line 52, replace “claims” by --claim--;

Column 11,
Line 34, replace “information” by --informations--;

Column 12,
Line 24, replace “anyone” by --any one--;

Column 13,
Line 2, after “screen”, insert --,--;
Line 6, replace “shoving” by --showing--.

Signed and Sealed this

First Day of August, 2006

JON W. DUDAS
*Director of the United States Patent and Trademark Office*